US012198501B2

(12) United States Patent
Higgins et al.

(10) Patent No.: US 12,198,501 B2
(45) Date of Patent: Jan. 14, 2025

(54) HISTORICAL HORSE RACING

(71) Applicant: IGT, Las Vegas, NV (US)

(72) Inventors: Kevin Higgins, Reno, NV (US); Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 80 days.

(21) Appl. No.: 17/991,614

(22) Filed: Nov. 21, 2022

(65) Prior Publication Data

US 2023/0086273 A1 Mar. 23, 2023

Related U.S. Application Data

(63) Continuation of application No. 17/330,079, filed on May 25, 2021, now Pat. No. 11,521,463.

(51) Int. Cl.
*G07F 17/32* (2006.01)
*G06Q 50/34* (2012.01)

(52) U.S. Cl.
CPC ......... *G07F 17/3258* (2013.01); *G06Q 50/34* (2013.01); *G07F 17/3211* (2013.01); *G07F 17/3288* (2013.01)

(58) Field of Classification Search
None
See application file for complete search history.

(56) References Cited

U.S. PATENT DOCUMENTS 6,358,150 B1 3/2002 Mir et al.
6,450,887 B1 9/2002 Mir et al.
7,566,268 B2 7/2009 Asher et al.
7,607,978 B2 10/2009 Palmer et al.
7,628,703 B2 12/2009 Wolf et al.
7,785,189 B2 8/2010 Brosnan et al.
7,931,531 B2 4/2011 Oberberger
8,079,902 B2 12/2011 Michaelson et al.
8,226,467 B2 7/2012 Weber et al.
8,360,835 B2 1/2013 Strause et al.
8,696,441 B2 4/2014 Haag et al.
8,793,321 B2 7/2014 Williams
9,047,737 B2 6/2015 Brooks et al.
9,053,608 B2 * 6/2015 Brooks ................ G07F 17/323
9,218,721 B2 12/2015 Herbert
9,552,690 B2 1/2017 Meyer
9,633,518 B2 4/2017 Herbert et al.
9,747,748 B2 8/2017 Corckran et al.
11,276,272 B2 3/2022 Casey et al.
11,710,383 B2 * 7/2023 Fulton ................ G07F 17/3213 463/20
2006/0277142 A1 12/2006 Mcgeorge
2007/0184892 A1 8/2007 Asher et al.
2007/0187889 A1 8/2007 Asher et al.
2007/0191085 A1 8/2007 Asher et al.
2008/0197573 A1 8/2008 Palmer (Continued)

OTHER PUBLICATIONS

Kentucky Pari-Mutuel Wagering Regulation, Section 810 KAR, 1:011, 7 pages.

*Primary Examiner* — Ronald Laneau
(74) *Attorney, Agent, or Firm* — Neal, Gerber & Eisenberg LLP

(57) ABSTRACT

Systems and methods that enable a player to place a wager on a historical horse race, wherein if the wager is determined to be a winning wager, a win amount for the winning wager is randomly selected from a pool of win amounts.

20 Claims, 11 Drawing Sheets

(56) References Cited

U.S. PATENT DOCUMENTS

| | | | | |
|---|---|---|---|---|
| 2011/0095483 | A1 | 4/2011 | Stein | |
| 2013/0178259 | A1 | 7/2013 | Strause et al. | |
| 2015/0018085 | A1 | 1/2015 | Herbert | |
| 2015/0262452 | A1 | 9/2015 | Corckran et al. | |
| 2015/0379816 | A1 | 12/2015 | Hayon | |
| 2016/0275755 | A1 | 9/2016 | Oh | |
| 2017/0084108 | A1 | 3/2017 | Smith | |
| 2018/0180702 | A1 | 6/2018 | Markhovsky et al. | |
| 2019/0180570 | A1 | 6/2019 | Czubak et al. | |
| 2019/0251789 | A1 | 8/2019 | Waters | |
| 2020/0175818 | A1 | 6/2020 | Joao | |
| 2020/0286333 | A1* | 9/2020 | Waters | G07F 17/3213 |
| 2020/0327777 | A1 | 10/2020 | Higgins et al. | |
| 2021/0327213 | A1 | 10/2021 | Casey et al. | |
| 2022/0180702 | A1* | 6/2022 | Casey | G07F 17/3288 |
| 2022/0189248 | A1 | 6/2022 | Maya et al. | |

* cited by examiner

1000

HISTORICAL HORSE RACING

PRIORITY CLAIM

This application is a continuation of, claims priority to and the benefit of U.S. patent application Ser. No. 17/330,079, filed on May 25, 2021, the entire contents of which is incorporated by reference herein.

BACKGROUND

In various embodiments, the systems and methods of the present disclosure operate to enable a player to place a wager on a historical horse race, wherein if the wager is determined to be a winning wager, a win amount is randomly selected from a pool of win amounts.

Certain gaming machines may provide players awards for games of chance based on the player obtaining a winning symbol combination and on an amount of a wager.

BRIEF SUMMARY

In certain embodiments, the present disclosure relates to a system including a processor, and a memory device that stores a plurality of instructions. When executed by the processor following a placement of a wager on an outcome of a historical horse race and responsive to a determination that the wager on the outcome of the historical horse race is a losing wager, the instructions cause the processor to communicate data that results in a display device causing a display of a losing game outcome in an alternative gaming presentation associated with the historical horse race. When executed by the processor following a placement of a wager on an outcome of a historical horse race and responsive to a determination that the wager on the outcome of the historical horse race is a winning wager, the instructions cause the processor to randomly select a win amount from a predetermined pool of win amounts, and communicate data that results in the display device causing a display of a winning game outcome associated with the randomly selected win amount in the alternative gaming presentation associated with the historical horse race.

In certain embodiments, the present disclosure relates to a system including a processor, and a memory device that stores a plurality of instructions. When executed by the processor responsive to a determination that a first wager placed on a historical horse race associated with a first game is a winning wager, the instructions cause the processor to randomly select a win amount from a first predetermined pool of win amounts associated with the first game, and communicate data that results in a display device causing a display of a winning game outcome associated with the randomly selected win amount in the first game. When executed by the processor responsive to a determination that a second wager placed on the historical horse race associated with a second game is a winning wager, the instructions cause the processor to randomly select a win amount from a second, different predetermined pool of win amounts associated with the second game, and communicate data that results in the display device causing a display of a winning game outcome associated with the randomly selected win amount in the second game.

In certain embodiments, the present disclosure relates to a system including a processor, and a memory device that stores a plurality of instructions. When executed by the processor following a placement of a wager on an outcome of a sporting event, the instructions cause the processor to allocate a portion of the wager to a pari-mutuel pool associated with the outcome of the sporting event. When executed by the processor responsive to a determination that the wager on the outcome of the sporting event is a winning wager, the instructions cause the processor to randomly select a win amount from a predetermined pool of win amounts, and communicate data that results in a display device causing a display of a winning game outcome associated with the randomly selected win amount in an alternative gaming presentation associated with the sporting event.

Additional features are described herein, and will be apparent from the following Detailed Description and the figures.

DETAILED DESCRIPTION

Figure 1:
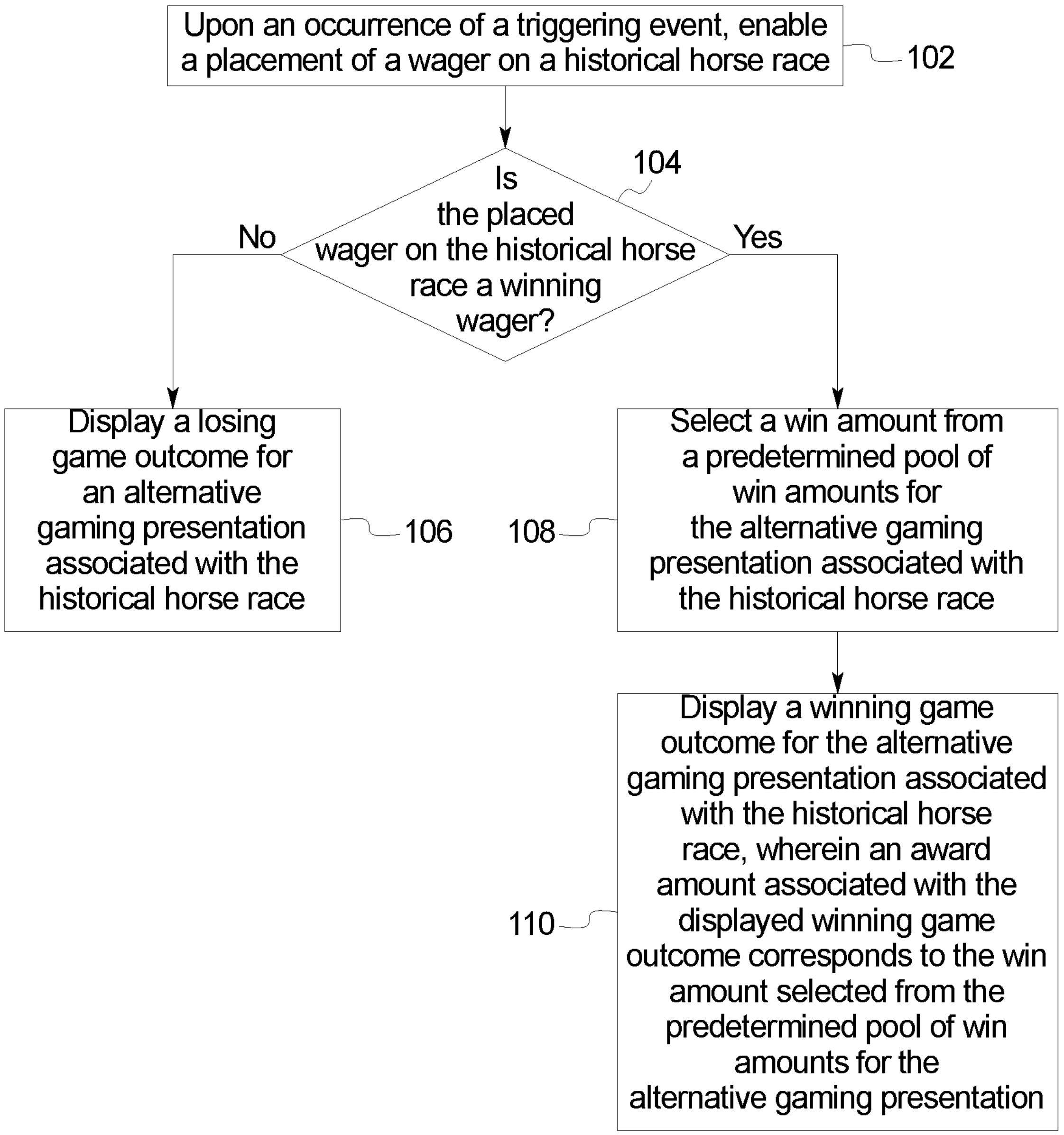
FIG. 1 is a flow chart an example process for operating a system which utilizes a pool of win amounts in association with a winning wager placed on a historical horse race.

In various embodiments, the present disclosure relates generally to systems and methods which utilize a pool of win amounts to select a win amount for placing a winning wager on a sporting event, such as a historical horse race.

In certain embodiments, in association with a wager placed on an outcome of a sporting event, the system determines whether the wager is a winning wager or a losing wager. If the system determines that the wager placed on the sporting event is a losing wager, the system displays an alternative gaming presentation associated with a losing game outcome. On the other hand, if the system determines that the wager placed on the sporting event is a winning wager, the system randomly selects a win amount from a designated pool of win amounts. In these embodiments, following the random selection of a win amount from the designated pool of win amounts, the system displays the alternative gaming presentation associated with a winning game outcome, wherein the award amount associated with the winning game outcome corresponds to the randomly selected win amount. Such a configuration provides that wagering on a sporting event is, in certain instances, more akin to wagering on a game of chance via the employment of a separate random determination of a win amount from a predetermined pool of win amounts to provide for a winning wager placed on one or more outcomes of the sporting event. This randomness introduces an element of probability-based gaming to sporting event wagering and further modifies the volatility associated with sporting event wagering.

More specifically and in one example embodiment of the present disclosure wherein the sporting event includes a historical horse race, the system enables a placement of a wager. Such a wager may be in the form of a wager amount on one or more manual or automatically selected horses or in the form of a wager amount on a game of chance (which includes the manual or automatic selection of one or more horses). Following the placement of the wager and a running of the historical horse race, the system determines whether or not the wager placed on the historical horse race is a winning wager. For example, if a wager was placed that a selected horse would win a historical horse race (i.e., a previously held race wherein certain information is anonymized to prevent a player from determining the results prior to the running of the historical horse race), following a running of the historical horse race, the system determines if the selected horse won the historical horse race.

If the system determines that the wager placed on the historical horse race is not a winning wager because the selected horse(s) did not finish the horse race as predicted with the wager, the system utilizes a game of chance (i.e., the alternative gaming presentation) to display a losing game outcome. Continuing with the above example, if the selected horse did not win the horse race, the system displays a play of a slot game that results in a losing symbol combination associated with an award of zero.

On the other hand, if the system determines that the wager placed on the historical horse race is a winning wager because the selected horse(s) finished the horse race as predicted with the wager, the system randomly selects a win amount from a pool of win amounts associated with the placed wager and the employed game of chance. Following the selection of a win amount from the pool of win amounts, the system utilizes the game of chance to display a winning game outcome and the randomly selected win amount. Continuing with the above example, if the selected horse won the horse race, the system first randomly selects a win amount from a pool of win amounts maintained for the wager amount placed on the displayed slot game. Following the selection of a win amount, the system proceeds to display the play of a slot game that results in a winning symbol combination associated with the randomly selected win amount.

As illustrated by this example embodiment, employing the central determination of a win amount for a historical horse race via utilizing the random selection of a win amount from a pool of win amounts associated with a wager placed and an employed alternative gaming presentation enables the historical horse racing wagering experience to more closely resemble a game of chance wagering experience. That is, by constructing the win amounts of the pool to be similar (in value and probability of being randomly selected) to the paytable of a game of chance, the system enables the historical horse racing wagering experience to correspond to a game of chance wagering experience (at least in terms of awards available and the probability of such awards being randomly selected). Such a configuration provides that while the volatility of the awards available for historical horse race wagering is similar to (or otherwise mirrors) the volatility of the awards for playing games of chance in a probability-based gaming environment, the total payback of the system is predictable and thus can be implemented in a non-probability-based gaming environment.

In addition to introducing elements of probability-based gaming to sporting event wagering, it should be appreciated that the employed alternative gaming presentation alters how the results of one or more sporting events are displayed to a player and thus improves the system interface as well as how the player interacts with the system. Specifically, since certain jurisdictions permit the wagering on historical horse racing, but prohibit the wagering on games of chance, such as slot games, the system of the present disclosure enables players in such jurisdictions to experience the plays of such games of chance while staying within the confines of which wagers are permitted and which wagers are prohibited. As such, the alternative gaming presentations utilized in association with certain sporting event wagers placed capture the interest of certain players that prefer the results of these sporting event wagers to be displayed in a different fashion.

It should be further appreciated that given the relatively slow pace of live sporting events (e.g., 30 minutes to an hour between each live horse race) and the relatively quick pace of playing games of chance (e.g., multiple games played per minute), the employment of historical sporting events, such as historical horse racing, enables more opportunities for players to engage the system and potentially win one or more awards. That is, the use of an alternative gaming presentation associated with a historical sporting event enables sporting event wagers to be placed and resolved at a pace associated with plays of games of chance to improve the operation of the system by offering more interactions per unit of time.

While certain embodiments of the present disclosure are directed to displaying the results of a sporting event, such as a historical horse race, utilizing an alternative gaming presentation of a primary game of chance, it should be appreciated that such embodiments may additionally or alternatively be employed in association with utilizing an alternative gaming presentation of one or more plays of one or more secondary games of chance, such as a play of a bonus game of chance. Additionally, while a credit balance, a wager, and any win amounts are displayed as an amount of monetary credits or currency in certain of the embodiments, one or more of such a credit balance, a wager, and any win amounts provided may be for non-monetary credits, promotional credits, and/or player tracking points or credits. Moreover, it should be appreciated that the system utilized to display alternative presentations of the results of a sporting event, such as a historical horse race, may be: any suitable electronic gaming machine ("EGM") including, but not limited to, a slot machine, a video poker machine, a video lottery terminal, a terminal associated with an electronic table game, a video keno machine, a video bingo machine, or a sports betting terminal; any suitable slot machine interface board which is in communication with an EGM and operable to cause one or more display devices to display such alternative gaming presentations; any suitable personal gaming device; and/or any suitable combination of a server operating with an EGM, a slot machine interface board of an EGM and/or a personal gaming device to enable the wagering on sporting events coupled with the alternative gaming presentations of the corresponding results.

FIG. 1 is a flowchart of an example process or method of operating the system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In different embodiments, upon an occurrence of a triggering event, the system enables a placement of a wager on a historical horse race as indicated in block 102.

Figure 2:
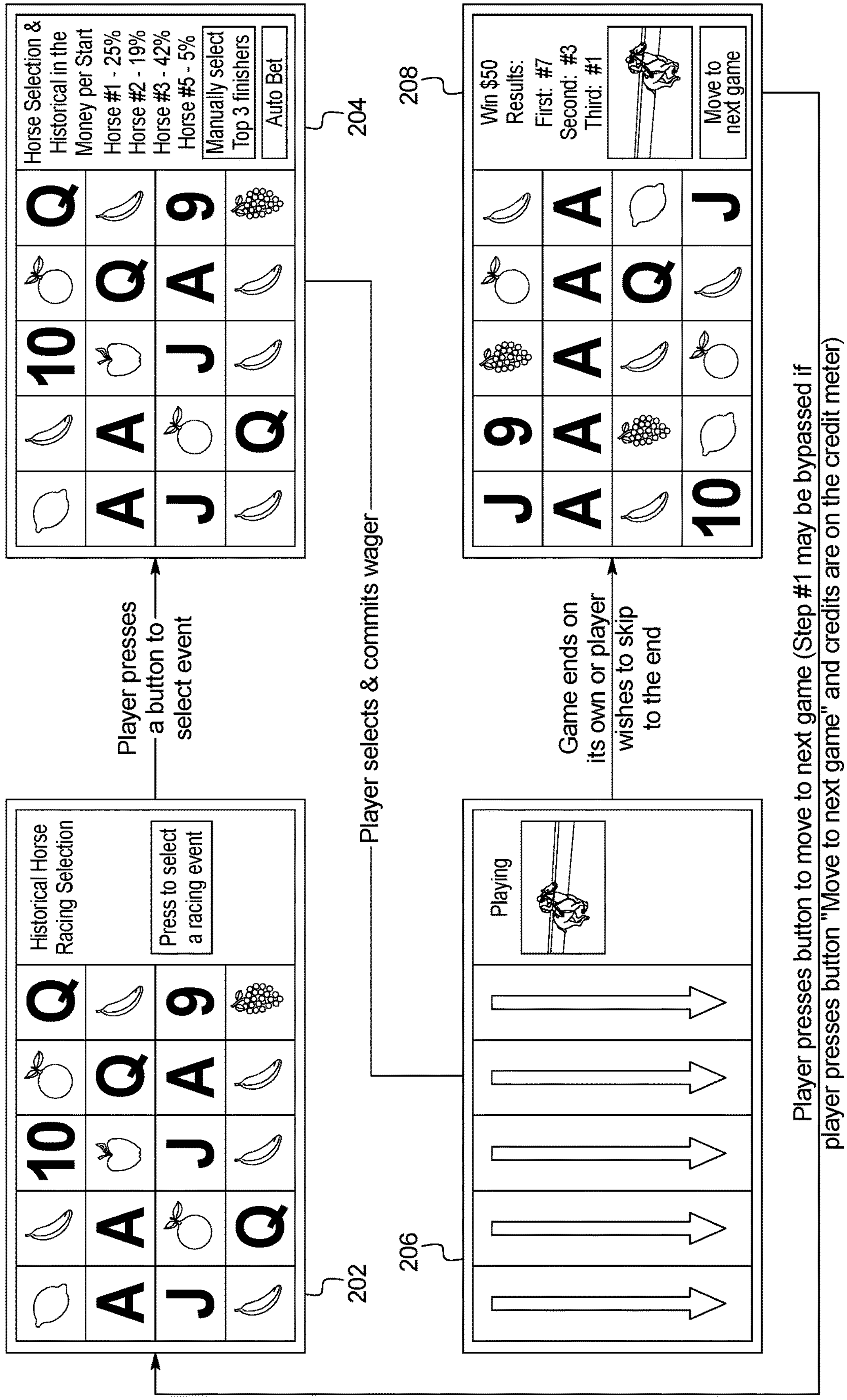
FIG. 2 are a plurality of front views of one embodiment of the system of the present disclosure illustrating the providing of a win amount selected from a pool of win amounts in association with a winning wager placed on a historical horse race.

In certain embodiments, the placement of a wager on a historical horse race includes an input associated with a selection of a historical horse race to place a wager on from a plurality of available historical horse races. For example, as seen in FIG. 2, the system enables the player to select a racing event to wager on 202. In certain embodiments, the placement of a wager on a historical horse race includes a random selection of a historical horse race to place a wager on from a plurality of available historical horse races. In certain embodiments, the system selects a historical horse race that may be currently wagered on and displays a countdown timer until that historical horse race is run and another historical horse race becomes available to be wagered on until that historical horse race is run.

In addition to the determination of the historical horse race to be wagered on, the placement of the wager on the historical horse race includes a selection of one or more horses (i.e., a selection of an outcome of a sporting event) and an amount to wager on such horses (i.e., an amount of a sporting event wager). For example, as seen in FIG. 2, the system enables the player to select one or more horses to wager on 204. In certain embodiments, the system receives one or more inputs associated with one or more horses running in the historical horse race in accordance with any suitable horse racing wagering model, such as a win wager, a show wager, a place wager, a quinella wager, a trifecta wager, a superfecta wager, a super high five wager, a double wager, a big Q wager, and/or a Pick-(n) wager. In certain embodiments, the system receives an input associated with an automatic selection of one or more horses running in the historical horse race in accordance with any suitable horse racing wagering model, such as, but not limited to, a win wager, a show wager, a place wager, a quinella wager, a trifecta wager, a superfecta wager, a super high five wager, a double wager, a big Q wager, and/or a Pick-(n) wager. In these embodiments, the system selects one or more horses to wager on based on the odds associated with such horses and historical information available.

In certain embodiments, the placement of a wager on a historical horse race includes a placement of a wager on the game employed as the alternative gaming presentation. In these embodiments, following a placement of a wager on the game employed as the alternative gaming presentation, the system determines one or more attributes of the wager to place on the historical horse race (e.g., the type of wager on the historical horse race, the amount of the wager on the historical horse race, and/or which horses of the historical horse race to wager on). For example, following one or more inputs by the player to select a number of paylines of a slot game to wager and an amount to wager on each activated payline, the system constructs a wager to be placed on the historical horse race which would correspond with the total amount of the wager placed on the slot game and the paytable employed for the wager placed on the slot game.

It should be appreciated that since the sporting event being wagered on in this illustrated example includes a historical horse race, to prevent users from determining an outcome of the historical sporting event prior to placing any wagers on such historical sporting events, the system masks certain of the identifying information associated with that sporting event. That is, the system anonymizes identifying information about horses, teams, historical team records, sporting event players, and/or historical sporting event player statistics each time that information is presented to users. In different embodiments, the historical sporting event includes a prerecorded sporting event, a recreation of a prior sporting event, and/or a simulated sporting event (e.g., a sporting event created from different parts of different historical sporting events wherein zero, one or more results of such a simulated sporting event are randomly determined).

While certain embodiments of the present disclosure are directed to placing a wager on a historical horse race wherein the outcome of the historical horse race may result in a random selection of a win amount from a pool of win amount, in different embodiments, the sporting event wagered on includes any suitable sporting event and/or electronic sporting event at any professional and/or amateur level including but not limited to, football, basketball, baseball, boxing, horse racing, wrestling, mixed martial arts, golf, cricket, soccer, hockey, field hockey, tennis, volleyball, table tennis, ruby, swimming, diving, archery, cycling, billiards, fishing, gymnastics, hunting, track and field, sailing, and/or car racing. Moreover, while certain embodiments of the present disclosure are directed to placing a wager on a historical horse race from any suitable horse racing wagering model, in different embodiments wherein the sporting event wagered on includes other types of sporting events, the wager placed includes any suitable type sporting event wager including, but not limited to, any suitable moneyline wager on an outcome of a sporting event (e.g., Team X will win the game), any suitable wager on an outcome of a sporting event which accounts for a point spread (e.g., Team X will win the game by ten points), any suitable proposition wager on an in-game event occurring or not occurring within the sporting event (e.g., Sporting Event Participant A will make the next free throw), a statistical bet regarding the total statistics associated with a sporting event (e.g., a total yards one team runs for in a football game), a statistical bet regarding the individual statistics associated with a sporting event (e.g., a total number of interceptions one player throws for during a game), a statistical bet regarding the total statistics associated with multiple sporting events (e.g., a total yards one team runs for over the first month of a season), a statistical bet regarding the individual statistics associated with multiple sporting events (e.g., a total number of interceptions one player throws for over an entire season), any suitable handicap wager, any suitable if and reverse wager, any suitable total/over-under wager, any suitable full cover wager, any suitable future/outright wager, any suitable parlay/accumulator multiple sporting event wagers (including but not limited to a progressive parlay wager, a teaser and pleaser wager, a grand salami wager, and/or a round robin wager) and/or any combination of these different available sporting event wagers.

In certain embodiments, in association with the determination of a historical horse race to wager on, the system receives an input associated with a selection of an alternative gaming presentation to employ to display the results of the placed wager. In certain of such embodiments, before or after the selection of one or more horses to wager on and/or the selection of an amount to wager, the system enables the player to select the type of game that will function as the alternative gaming presentation. In certain other embodiments, in lieu of the selection of one or more horses to wager on, the system enables the player to select the type of game that will function as the alternative gaming presentation wherein based on the parameters of the selected game that will function as the alternative gaming presentation (e.g., the denomination of the game, the number of paylines to wager on, the amount to wager on each payline), the system determines which horse(s) to wager on to correspond with the selected parameters of the game that will function as the alternative gaming presentation. In different embodiments, to display the results of a historical horse race, the system employs an alternative gaming presentation taking the form of one or more plays of any suitable game of chance, such as, but not limited to, one or more plays of any suitable slot game; one or more plays of any suitable wheel game; one or more plays of any suitable card game; one or more plays of any suitable offer and acceptance game; one or more plays of any suitable award ladder game; one or more plays of any suitable puzzle-type game; one or more plays of any suitable persistence game; one or more plays of any suitable selection game; one or more plays of any suitable cascading symbols game; one or more plays of any suitable ways to win game; one or more plays of any suitable scatter pay game; one or more plays of any suitable coin-pusher game; one or more plays of any suitable elimination game; one or more plays of any suitable stacked wilds game; one or more plays of any suitable trail game; one or more plays of any suitable bingo game; one or more plays of any suitable video scratch-off game; one or more plays of any suitable pick-until-complete game; one or more plays of any suitable shooting simulation game; one or more plays of any suitable racing game; one or more plays of any suitable promotional game; one or more plays of any suitable high-low game; one or more plays of any suitable lottery game; one or more plays of any suitable number selection game; one or more plays of any suitable dice game; one or more plays of any suitable partial skill game; one or more plays of any suitable auction game; one or more plays of any suitable reverse-auction game; and/or one or more plays of any suitable group game.

It should be appreciated that in certain embodiments, one of more of the parameters of the wager placed on the historical horse race correspond to one or more of the parameters of the game employed as the alternative gaming presentation. That is, based on any of the historical horse race to be wagered on, the type of wager placed on the historical horse race, the amount of the wager placed on the historical horse race and/or one or more horses wagered on, the system configures one or more parameters of the game employed as the alternative gaming presentation.

Figure 3:
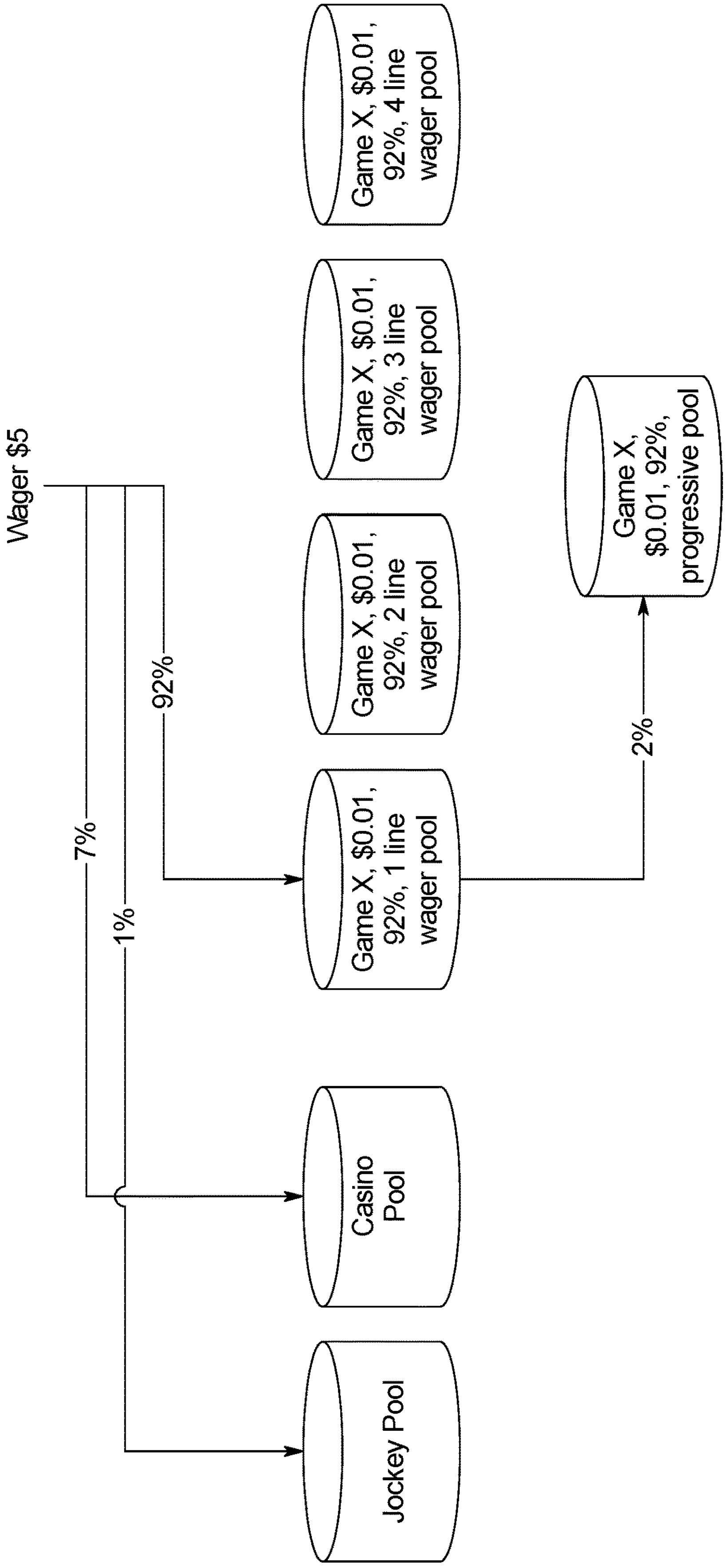
FIG. 3 is an example configuration of a plurality of pools funded via a wager placed on a historical horse race.

In certain embodiments, following the placement of the wager on the historical horse race, the system allocates the amount of the wager to one or more wager pools associated with the historical horse race. In these embodiments, based on the different entities associated with the running of the historical horse race and further based on different jurisdictional requirements, the system allocates different portions of the amount wagered on the historical horse race to different wager pools associated with these different entities. For example, as seen in FIG. 3, for a wager of $5 placed on a historical horse race which corresponds to a wager of $5 on a single payline of Game X (i.e., a game of chance associated with, amongst others, a specific paytable), the system allocates: 1% of that wager to a wager pool associated with a jockey group, 7% of that wager to a wager pool associated with a gaming establishment (i.e., the house's take) and 92% of that wager to a wager pool associated with the wagering on the single payline of Game X. It should be appreciated that in certain embodiments, the system maintains 1 to N pari-mutuel wager pools associated with a historical horse race and the alternative gaming presentation being played, wherein different alternative gaming presentations are associated with different pari-mutuel wager pools. In these embodiments, different alternative gaming presentations associated with different attributes (e.g., different wager amounts placed, different themes, different paytables and/or different denominations) are associated with different wager pools which a portion of any wagers placed in association with that alternative gaming presentation are allocated to. For example, as also seen in FIG. 3, since the alternative gaming presentation of a single payline of Game X being wagered on is employed (as opposed to the alternative gaming presentations of two, three or four paylines being wagered on for Game X), the system allocates a portion of the $5 wager to that alternative gaming presentation (and allocates no portion of the $5 wager to any wager pools associated with the alternative gaming presentations for two, three or four paylines being wagered on for Game X).

In certain embodiments, the allocation of a portion of a wager placed on a selected alternative gaming presentation is further allocated to one or more supplemental wager pools associated with that alternative gaming presentation. In this example and as further seen in FIG. 3, the system further allocates 2% of the 92% percent allocated to the wager pool associated with the wagering on the single payline of Game X to a progressive award pool associated with wagering on the single payline of Game X. It should be appreciated that while illustrated as employing a progressive award pool, in different embodiments, other portions of the wager placed on the historical horse race may be allocated to different supplemental wager pools, such as, but not limited to, one or more reserve pools, one or more overflow pools, one or more seeds pools, one or more pools related to individual bonuses in one or more games, and/or one or more pools related to different wager categories in one or more games.

In certain embodiments wherein the running of the historical horse race occurs at the conclusion of a period of time to place wagers on the historical horse race (and/or based on a quantity of other wagers being placed), following the placement of the wager on the historical horse race and the allocation of the wager placed to one or more wager pools, the system determines if the period of time to place wagers on the historical horse race has concluded (and/or if the quantity of other wagers were placed). In these embodiments, if the period of time to place wagers on the historical horse race has not concluded (and/or the quantity of other wagers were not placed), the system repeats, at a designated interval, the determination of if the period of time to place wagers on the historical horse race has concluded (and/or the quantity of other wagers were placed). On the other hand, if the period of time to place wagers on the historical horse race has concluded (and/or the quantity of other wagers were placed), the system proceeds to run the historical horse race. In certain other embodiments wherein the running of the historical horse race is on-demand (i.e., not being run at the conclusion of a period of time to place wagers on the historical horse race or based on a certain quantity of other wagers being placed), following the placement of the wager on the historical horse race and the allocation of the wager placed to one or more wager pools, the system proceeds to run the historical horse race.

In certain embodiments, in association with the running of the historical horse race, the system displays the alternative gaming presentation. In certain such embodiments, the system displays the alternative gaming presentation simultaneously (or sequentially) with the display of the running of the historical horse race. For example, as seen in FIG. 2, after the player selects and commits a wager on the historical horse race, the system displays a plurality of reels spinning for a play of a slot game (i.e., the alternative gaming presentation) while also displaying the running of the historical horse race 206. In certain other embodiments, the system displays the alternative gaming presentation without displaying the running of the historical horse race.

Following the running of the historical horse race (which, in certain embodiments, occurs after the historical horse race is displayed and, in certain other embodiments, occurs after the receipt of an input to skip to the end of the historical horse race), the system determines if the placed wager on the historical horse race is a winning wager as indicated in diamond 104 of FIG. 1. That is, the system determines if the wagered on outcome of the historical horse race is the actual outcome of the historical horse race (i.e., a winning wager on the historical horse race) or is not the actual outcome of the historical horse race (i.e., a non-winning or losing wager on the historical horse race).

If the placed wager on the historical horse race is not a winning wager, the system displays a losing game outcome for an alternative gaming presentation associated with the historical horse race as indicated in block 106. That is, upon a determination that the wager placed on the historical horse race is a losing wager not associated with any award (or otherwise associated with an award having no value), the system proceeds to display an outcome of the alternative gaming presentation that is not associated with any award. In certain embodiments, the system also displays the final results of the historical horse race wherein the final results do not correspond with the wager placed on the historical horse race being a winning wager.

On the other hand, if the placed wager on the historical horse race is a winning wager, the system selects a win amount from a predetermined pool of win amounts for the alternative gaming presentation associated with the historical horse race as indicated in block 108. In these embodiments, the predetermined pool of win amounts includes a plurality of win amounts for winning game outcomes (and not including any win amounts for any losing game outcomes) wherein the determination of a winning wager on the historical horse race results in the selection of a win amount from the associated pool of win amounts. As such and similar to pari-mutuel wagering wherein the amount of the win for a winning wager is not known until the wager pool is closed, the amount of the win for the winning wager of the historical horse race of the present disclosure is not known until a selection of a win amount from the associated pool of win amounts occurs.

Figure 4A:
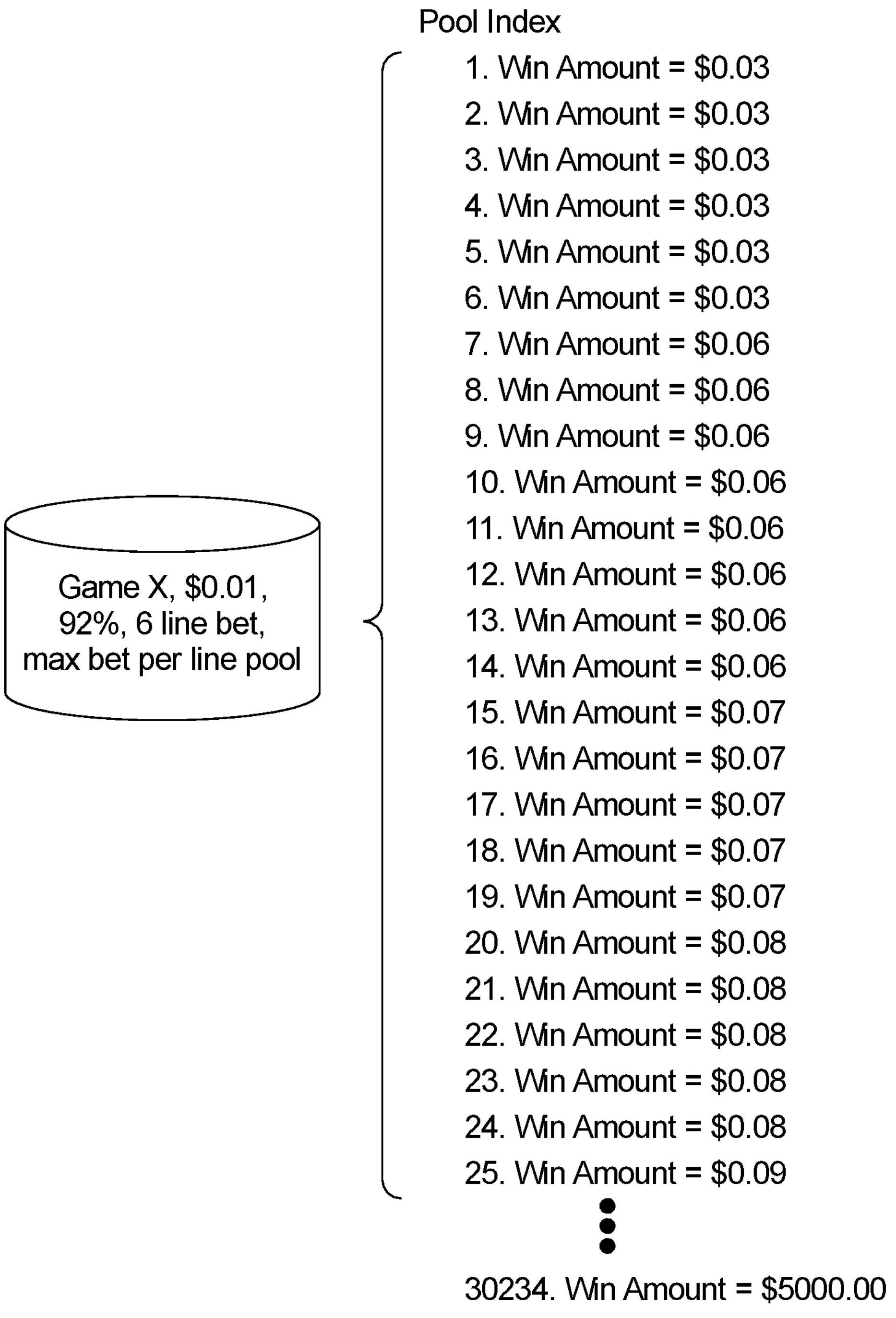
FIG. 4A is an example configuration of a plurality of win amounts of a pool of win amounts.

In certain embodiments, the pool of win amounts includes a plurality of monetary awards, such as the win amounts illustrated in FIG. 4A. In certain embodiments, the pool of win amounts includes a plurality of non-monetary awards, such as virtual currency or points. In certain embodiments, the pool of win amounts includes a plurality of monetary awards and a plurality of non-monetary awards, such as virtual currency or points.

In certain embodiments, the system maintains a predetermined pool of win amounts associated with a historical horse race and the alternative gaming presentation being played. In these embodiments, the win amounts of a predetermined pool and the probability of the different win amounts being selected corresponds with a paytable of the alternative gaming presentation employed such that the historical horse race wagering experience is similar to a probability-based wagering experience (insofar as the win amounts available and the probability of obtaining such win amounts). That is, the win amounts which form the pool of win amounts employed for the alternative gaming presentation and wager combination chosen by the player will be weighted by odds such that the wager placed on the historical horse race will be associated with a predetermined payback percentage (e.g., 95%, 92%, 88%) similar to probability-based gaming.

Figure 4B:
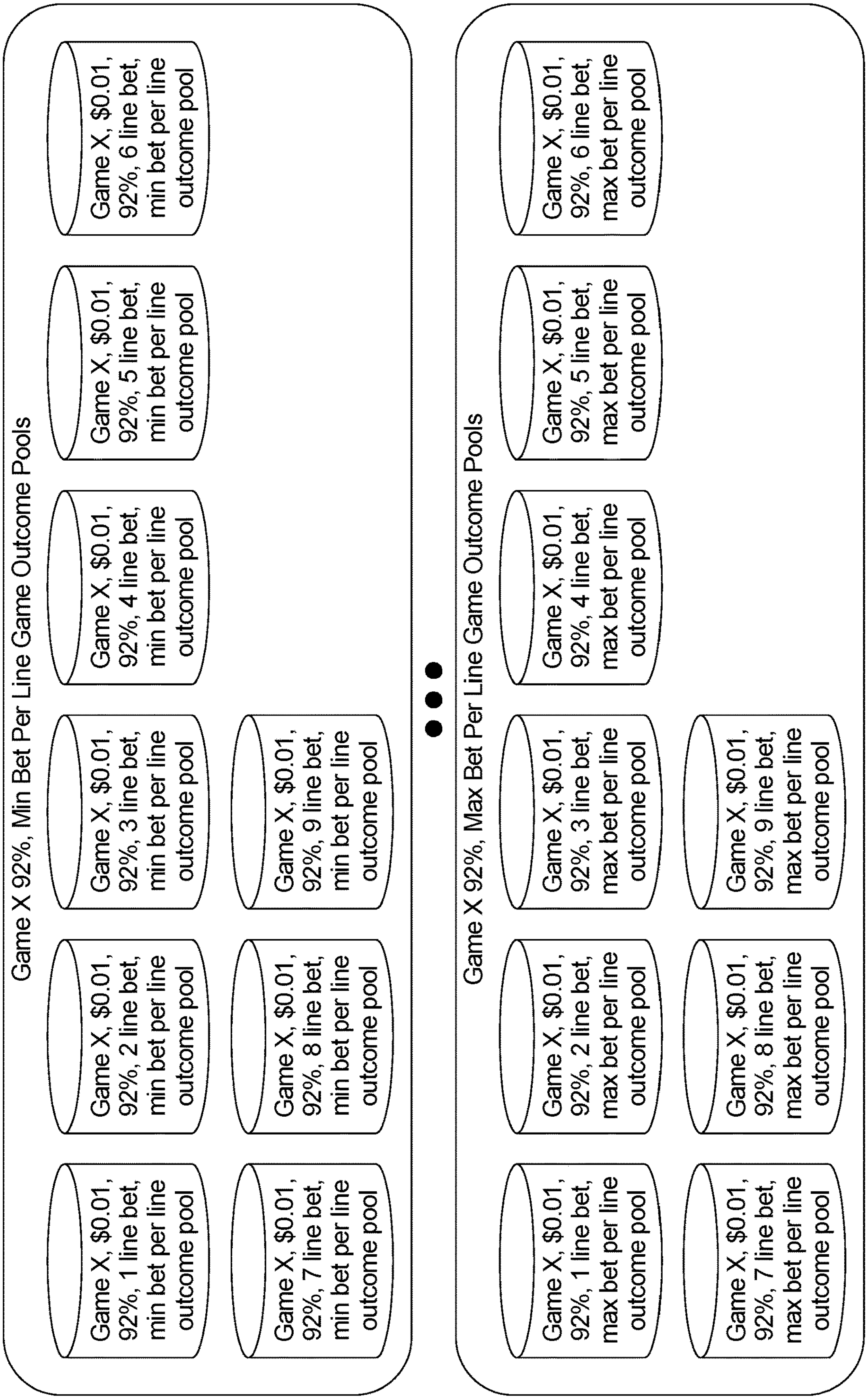
FIG. 4B is an example configuration of the plurality of pools of win amounts associated with the different combinations of a wager placed on a historical horse race and the parameters of the alternative gaming presentation employed to display the results of that historical horse race.

It should be appreciated that different alternative gaming presentations associated with different parameters or attributes (e.g., different wager amounts placed, different themes, different paytables and/or different denominations) are associated with different predetermined pools of win amounts employed for the selection of a win amount if the wager placed on a historical horse race is determined to be a winning wager. For example, as seen in FIG. 4B, the system maintains a predetermined pool of win amounts for different amounts wagered (i.e., a minimum bet per payline and a maximum bet per payline) on different numbers of paylines for the alternative gaming presentation employing Game X wherein which pool of win amounts is utilized is based on the total wager placed on the historical horse race associated with the alternative gaming presentation of Game X.

In certain embodiments wherein the system enables a player to wager different wager amounts per payline, the system utilizes different pools of win amounts for the different wager amounts. In another embodiment wherein the system enables a player to wager different wager amounts per payline, the system utilizes the same pool of win amounts irrespective of the wager amount. In this embodiment, rather than the win amounts having static values, each win amount has a dynamic value which is determined based on a multiplier of the win amount applied to the player's amount wagered.

In certain embodiments, the system randomly selects a win amount from the pool of win amounts employed for the winning historical horse race wager. In these embodiments, the system randomly picks a win amount from the applicable pool when a win amount is requested (i.e., upon a determination that the wager on the historical horse race is a winning wager). In one such embodiment, the system employs a random number generator ("RNG") to pick an index value in the set of win amounts between zero and the current total number of win amounts in the pool. In another such embodiment, the system uses an RNG to randomly shuffle the win amounts when a pool is created and then the system picks a win amount from the pool at race runtime. In this embodiment, the win amount picked could be any win amount in the pool, such as, but not limited to, the first win amount, the win amount at the top of the pool where the pool is organized as a Stack data structure, or the last win amount. In certain embodiments, the RNG comprises a pseudorandom RNG that is seeded when the system starts up or at runtime of the historical horse race using a cryptographically secure random number generator. In certain other embodiments, the pseudorandom RNG is seeded or influenced by the outcome of the historical horse race. For example, the seed data used to seed the pseudorandom RNG includes the number of the horse that finished first, second, and third in the historical horse race.

In certain embodiments, the system enables the same win amount to be repeatedly selected from a pool of win amounts. In these embodiments, the system employs a pick with replacement technique wherein the system picks a win amount from the employed pool of win amounts and the picked win amount continues to exist in the pool for later selections of win amounts. In certain embodiments, the system disables the same win amount from being repeatedly selected from a pool of win amounts. In these embodiments, the system employs a pick without replacement technique wherein the system picks a win amount from the pool of win amounts and that win amount is removed from the pool (i.e., once selected, a win amount no longer exists in the pool). In such embodiments employing this pick without replacement technique, the pool will become exhausted as more win amounts are selected and will need to eventually be rehydrated with win amounts or replaced with another pool of win amounts. It should be appreciated that in instances where the selection of a win amount from pool of win amounts results in the removal of that win amount from the pool, the selection of a win amount for a winning wager on a sporting event from a pool of win amounts associated with the wager placed on the sporting event complies with certain regulatory bodies in certain jurisdictions that do not permit the use of probability-based electronic gaming machines in-part because of the uncertainty faced by players and gaming establishments regarding which awards are actually determined versus which awards should be theoretically determined. Since these regulatory bodies permit the use of electronic gaming machines which are guaranteed to provide certain or definite awards, so that, for example, a certain number of wins is guaranteed and the overall amount paid back to players is guaranteed, the present disclosure selects win amounts from a pool of win amounts for winning wagers on sporting events such that over the use of the entire pool of win amounts, the payback percentage of the system is static and not a theoretical average expected amount.

In certain embodiments, the win amount selected includes seed values used by the system to display a winning outcome in the alternative gaming presentation associated with an award equal to the win amount selected. In certain other embodiments, the win amount selected does not include such seed values and the system determines and displays a winning outcome in the alternative gaming presentation associated with an award equal to the win amount selected.

Following the selection of a win amount from the applicable pool of win amounts employed for the wager placed on the historical horse race and the selected alternative gaming presentation, as indicated in block 110 of FIG. 1, the system displays a winning game outcome for the alternative gaming presentation associated with the historical horse race wherein an award amount associated with the displayed winning game outcome corresponds to the win amount selected from the predetermined pool of win amounts for the alternative gaming presentation. That is, upon a determination that the wager placed on the historical horse race is a winning wager and the subsequent determination of an amount of the winning wager (via the selection of a win amount from an applicable pool of win amounts), the system proceeds to display an outcome of the alternative gaming presentation that is associated with the selected win amount. In certain embodiments, the system also displays the final results of the historical horse race wherein the final results correspond with the wager placed on the historical horse race being a winning wager associated with the selected win amount. For example, as seen in FIG. 2, after the determination that the wager placed on the historical horse race is a winning wager and after the random selection of a win amount of $50 from the applicable pool of win amounts for the slot game played, the system displays the plurality of reels for the play of the slot game stopping to form a winning symbol combination associated with an award of $50 while also displaying the results of the historical horse race 208.

Figure 5A:
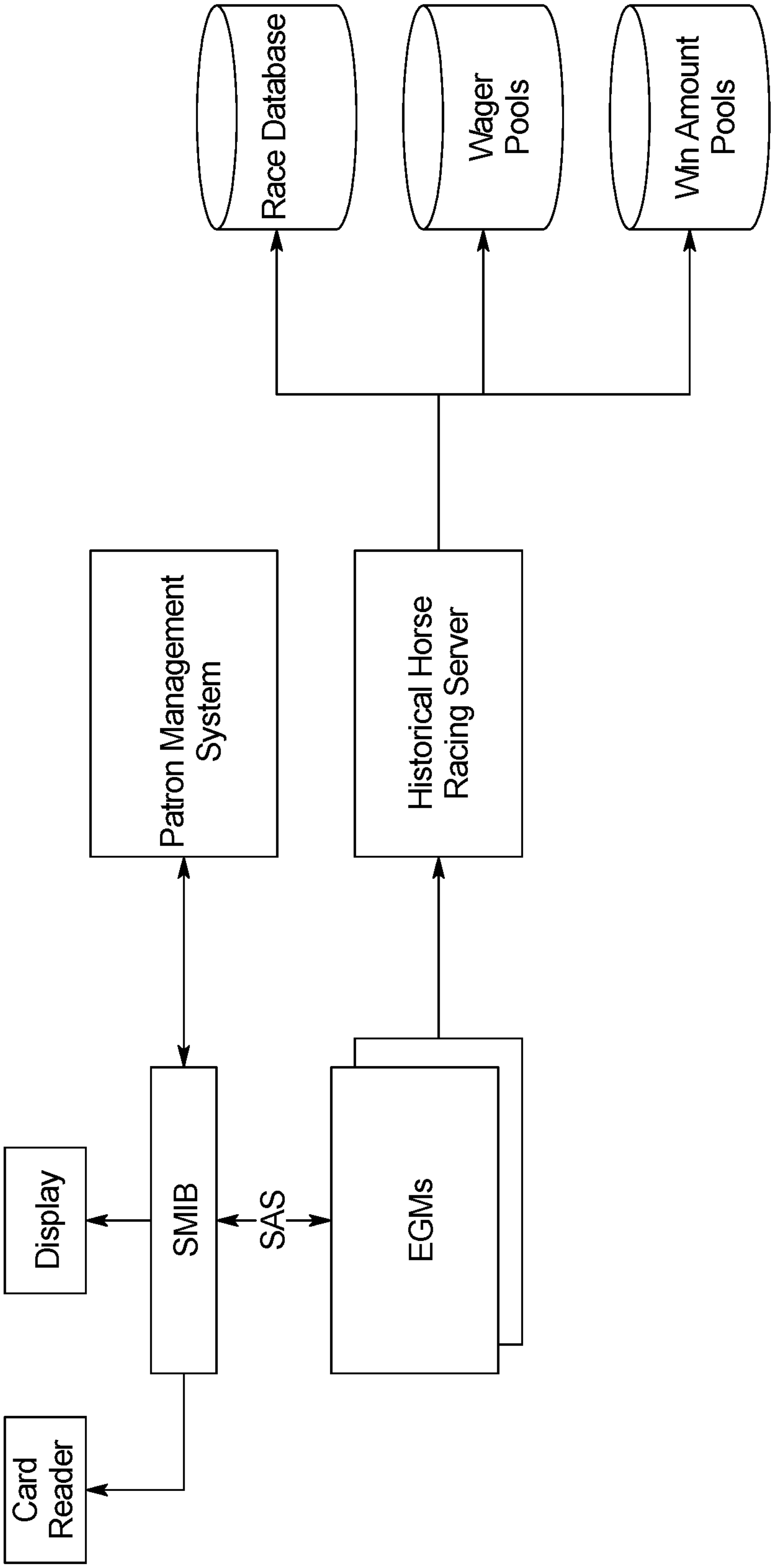
FIG. 5A is an example configuration of the architecture of a plurality of different components of the system of the present disclosure.
Figure 5B:
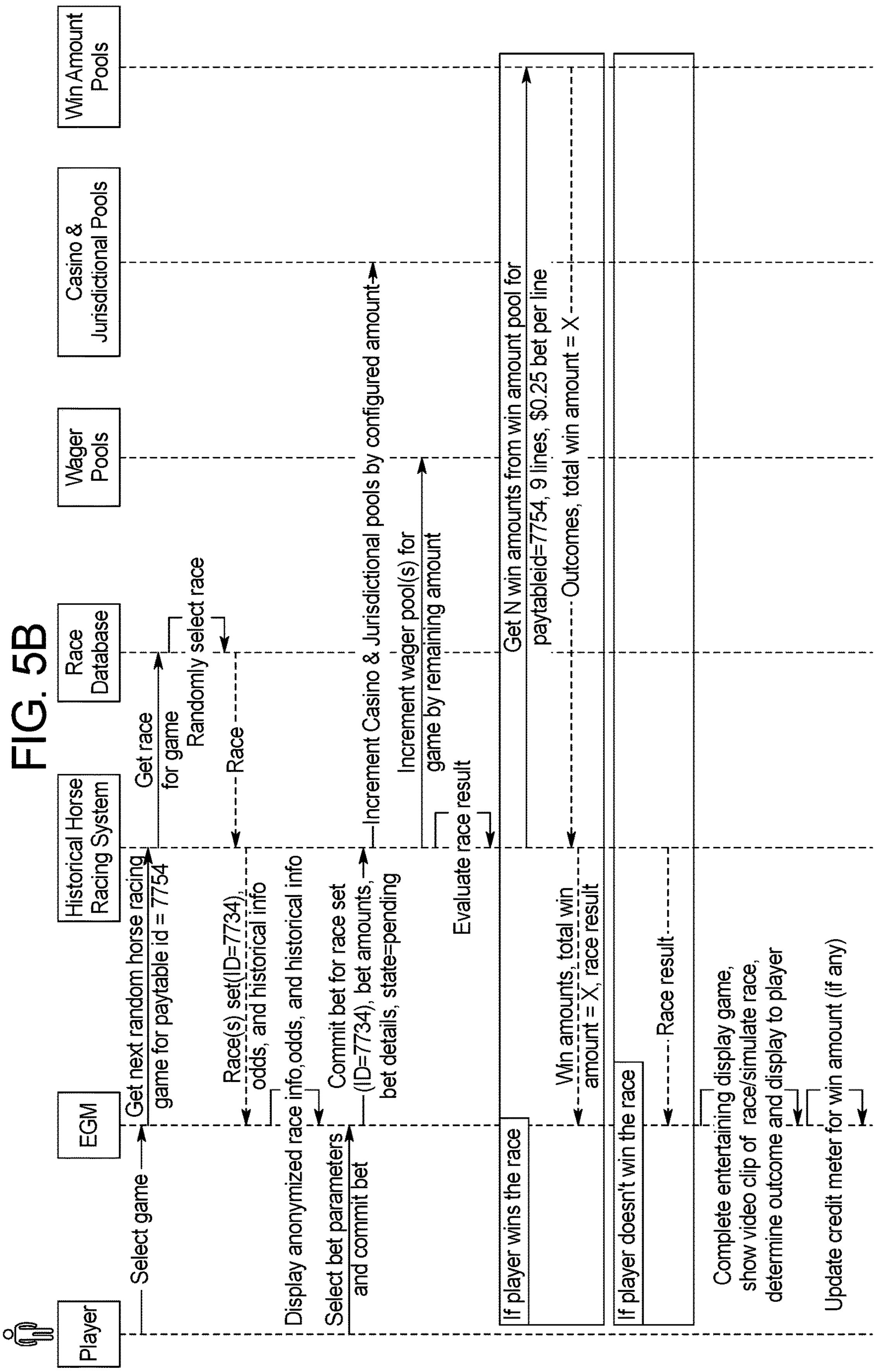
FIG. 5B is a flowchart of an example process for operating the system which utilizes a pool of win amounts in association with a winning wager placed on a historical horse race employing the components of FIG. 5A.

Accordingly, as illustrated in FIGS. 5A and 5B, the system employs a plurality of different components (i.e., an EGM in communication with a slot machine interface board ("SMIB") including a card reader and a display device, that operates with a gaming establishment patron management system and a historical horse racing server which is in communication with a database of historical horse races, a plurality of wager pools and a plurality of win amount pools) that interact with each other to enable a wager to be placed on a historical horse race (i.e., randomly selected race ID 7734) wherein following the allocation of different portions of the wager placed to different pools and the running of the race, the system determines if the wager placed qualifies as a winning wager. In this illustrated example, if the wager placed on the historical horse race is not a winning wager, the system displays the results of the historical horse race and employs an alternative gaming presentation to display a losing game outcome. On the other hand, in this illustrated example, if the wager placed on the historical horse race is a winning wager, the system selects a win amount from a pool of win amounts applicable to the paytable of the alternative gaming presentation and displays that win amount as a winning game outcome associated with an award corresponding to the selected win amount.

In accordance with the illustrated embodiments, it should be appreciated that employing the central determination of a win amount for a historical horse race via utilizing the random selection of a win amount from a pool of win amounts associated with a wager placed and an employed alternative gaming presentation enables the historical horse racing wagering experience to more closely resemble a game of chance wagering experience. That is, by constructing the win amounts of the pool to be similar (in value and probability of being randomly selected) to the paytable of a game of chance, the system enables the historical horse racing wagering experience to correspond to a game of chance wagering experience (at least in terms of awards available and the probability of such awards being randomly selected). Such a configuration provides that while the volatility of the awards available for historical horse race wagering is similar to (or otherwise mirrors) the volatility of the awards for playing games of chance in a probability-based gaming environment, the total payback of the system is predictable and thus can be implemented in a non-probability-based gaming environment.

While certain embodiments of the present disclosure are directed to placing a wager on a historical horse race wherein the outcome of the historical horse race may result in a random selection of a win amount from a pool of win amounts, in different embodiments, the wager placed is associated with any live sporting events, such as sporting events currently being played, wherein the win amount for a winning wager on that live sporting event is based on a random selection from a pool of win amounts. In certain embodiments, the wager placed is associated with any future sporting events, such as sporting events that will soon be played. In these embodiments, the system displays any identifying information regarding the sporting event, such as identifying the participants in the sporting event, information about the participants historical performance in similar sporting events, and the odds of one or more sporting event wagers available in association with such sporting events. It should be appreciated that if the system subsequently or concurrently displays one or more sporting events associated with one or more wagers placed, in different embodiments, the system may display a live broadcast of the sporting event or an animated or textual representation of the sporting event, and the sporting event may or may not be displayed in its entirety or portions of the sporting event may or may not be displayed periodically, such as in the form of replays or highlight reels. In certain embodiments, the wager placed is associated with one or more virtual or electronic sport ("eSport") events. In different embodiments, such virtual or eSports events are played by humans, by computer driven participants or by a mix of human and computer driven participants.

In certain embodiments wherein certain jurisdictional regulations require that the win amount for a winning wager placed on a historical horse race cannot be less than the amount of the wager placed, the system classifies each wager placed as a multiple of the minimum wager on the same single historical horse race. That is, the system considers each wager placed to be a quantity of iterations of the minimum wager available to be placed such that if the wager on the historical horse race is a winning wager, the system determines a quantity of win amounts (from the applicable pool of win amounts) equal to the quantity of iterations of the minimum wager. For example, if the minimum wager amount available to be placed on a historical horse race is $1 and the user wagers $5 (i.e., the minimum wager x five) on a selected horse to win, the system selects five win amounts from the employed pool of win amounts to account for the five instances of the minimum wager placed. In certain embodiments, the system offers different odds of winning by changing the set of available historical horse races based on the multiple of the minimum wager selected by the player (and the parameters associated with the employed alternative gaming presentation). In certain other embodiments, the system offers different odds of winning by changing the horse racing wagering model on that historical horse race based upon the type of wager selected.

In certain embodiments wherein certain jurisdictional regulations require that the win amount for a winning wager placed on a historical horse race cannot be less than the amount of the wager placed, the system classifies every wager (including a wager amount equal to the minimum wager amount) as associated with a static number of historical horse races and the placed wager is tied to wagers across a plurality of the static set of historical horse races. In these embodiments, the system considers each wager placed to be a quantity of iterations of the minimum wager available to be placed such that the player wagers across the static set of historical horse races using one of the horse racing wagering models that requires the player to wager across a series of horse races. In these embodiments, such horse racing wagering models include, but are not limited to: a double pool (i.e. a model that requires the selection of the first-place finisher in each of two specified races), a win three pool (i.e., a model requires the selection of the first-place finisher in each of three specified races), a pick (n) pool (i.e., a model that requires the selection of the first-place finisher in each of a designated (n) number of races), a place pick (n) pool (i.e., a model that requires the selection of the first or second-place finisher in each of a designated number of races), a quinella double pool (i.e., a model that requires the selection of the first two finishers, irrespective of order, in each of two specified races), a twin quinella pool (i.e., a model that requires selection of the first two finishers, irrespective of order, in each of two designated races), a twin trifecta pool (i.e., a model that requires selection of the first three finishers, in their exact order, in each of two designated contests), a tri-superfecta pool (i.e., a model that requires selection of the first three finishers, in their exact order, in the first of two designated races and the first four finishers, in exact order, in the second of the two designated races), a twin superfecta pool (i.e., a model that requires selection of the first four finishers, in their exact order, in each of two designated contests), an exacta (n) pool (i.e., a model that requires selection of the first two finishers, in their exact order, in each of a designated number of contests), and/or a pick (n) position (x) pool (i.e., a model that requires the selection of the first (x) finishers, in their exact positions, in each of a designated number of (n) contests).

It should be appreciated that the flexibility in being able to mix and match the number of historical horse races and horse racing wagering model type tied to a specific wager offers flexibility to game designers when designing historical horse racing alternative gaming presentations that are trying to approximate the play and feel of a probability-based game of chance. For example, if the player places a wager of $0.01 on an EGM for a game with a set of parameters (e.g., a 9 line slot game with a $0.01 denomination and a maximum wager of $0.25 per payline) to be displayed as an alternative gaming presentation, then the player presses a button on the EGM to select a set of horse races at the selected wager. In this example, if the player selected the maximum wager, then the system determines a horse race and a suitable horse racing wagering model type for the desired payback odds (i.e., a place pick (3) pool model that requires the player to pick the first or second place finisher across 3 horse races). In this example, if the player's wager is a winner, then the system will select one or more win amounts randomly from the pool of win amounts associated with the employed alternative gaming presentation. For example, for the maximum wager amount being placed, the most the system will select from the pool of win amounts will be 225 winners (i.e., 225=9 paylines selected*25 (25 instances of the minimum wager of $0.01 per payline). Following the selection of one or more win amounts, the system proceeds to display a game outcome for the alternative gaming display that corresponds to the total win amount selected from the pool of win amounts.

In certain other embodiments wherein certain jurisdictional regulations require that the win amount for a winning wager placed on a historical horse race cannot be less than the amount of the wager placed, the system employs a personalized carryover pool, such as an escrow pool which receives selected win amounts less than the wager amount placed. In these embodiments, if the win amount selected for the placed winning wager is not at least equal to the wager amount placed, the system contributes the selected win amount to the personalized carryover pool. In one such embodiment, the system begins tracking a personalized carryover pool for a player when a gaming session starts at an EGM, such as upon the player inserting a player tracking card or otherwise associating their player tracking account with the EGM. In another such embodiment, the system begins tracking a personalized carryover pool for a player when one or more activities occur in association with a gaming session, such as the player inserts or otherwise transfers funds to the EGM.

In certain embodiments, the system does not display to the player any indication of the amount maintained in the personalized carryover pool. In certain other embodiments, the system displays to the player an indication of the amount maintained in the personalized carryover pool, such as by displaying a value due to the player on their next win of at least the minimum wager amount, a non-numerical indication of the value due to the player on their next win of at least the minimum wager amount and/or a set of icons or symbols representative of the amount maintained in the personalized carryover pool.

In certain embodiments, upon a win of a subsequent historical horse race and the selection of a win amount (which, when alone or combined with the amount in the personalized carryover pool is at least equal to the wager amount placed), part or all of the amount maintained in the personalized carryover pool is added to the selected win amount, thereby increasing the amount won for the subsequent historical horse race. In certain embodiments, if the player ends their gaming session with any value in their personalized carryover pool that is not distributed, then the remaining amount can be contributed to one or more alternative pools, such as, but not limited to, a carryover pool associated with the next play session at that EGM, a carryover pool associated with that particular player that can be accessed at another EGM, a pool associated with the current game theme/game combination last played by the player and/or a shared pool that can fund other game themes. In these embodiments, the ending of the gaming session (which may cause the transfer of any funds in the personalized carryover pool to an alternative pool) occurs as a result of any suitable event, including, but not limited to, one or more of the player pressing a cashout button, the player removing their player tracking card and/or the credit meter equaling zero (or is otherwise below the minimum wager amount) and the player does not deposit additional funds within a timeout period (e.g., 30 seconds)

In certain embodiments, one or more awards provided in association with the wagered on historical horse race (which is selected from a pool of awards or win amounts) include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a relatively high value product such as a free car, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the system, virtual goods not associated with the system, an access code usable to unlock content on an internet.

In one embodiment, the system causes at least one display device of the system to display the running of the historical horse race and/or the play of the game associated with the historical horse race displayed as the alternative gaming presentation. In another embodiment, the system additionally or alternatively causes one or more community or overhead display devices to display part or all of the running of the historical horse race and/or the play of the game associated with the historical horse race displayed as the alternative gaming presentation to one or more other players or bystanders either at a gaming establishment or viewing over a network, such as the internet. In another embodiment, the system additionally or alternatively causes one or more internet sites to each display the running of the historical horse race and/or the play of the game associated with the historical horse race displayed as the alternative gaming presentation such that a player is enabled to log on from a personal web browser. In another such embodiment, the system enables the player to view the running of the historical horse race and/or the play of the game associated with the historical horse race displayed as the alternative gaming presentation on one device while viewing another running of the historical horse race and/or the play of another game associated with the other historical horse race displayed as the alternative gaming presentation from another device.

Alternative Embodiments

It should be appreciated that in different embodiments, one or more of:

i. when a game triggering event occurs;
ii. which historical horse race to run;
iii. when to run a historical horse race;
iv. a quantity of win amounts in one or more pools of win amounts;
v. which win amounts to include in a pool of win amounts;
vi. which pool of win amounts to associate with which wagers placed;
vii. which win amount(s) to select from a pool of win amounts;
viii. when to retire a pool of win amount (and start drawing from a new pool of win amounts);
ix. how a selected win amount will be displayed; and/or
x. any determination disclosed herein is/are predetermined, randomly determined, randomly determined based on one or more weighted percentages, determined based on a generated symbol or symbol combination, determined independent of a generated symbol or symbol combination, determined based on a random determination by a server, determined independent of a random determination by a server, determined based on a random determination at an EGM, determined independent of a random determination at the EGM, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

It should be appreciated that the present disclosure contemplates a variety of different systems each having one or more of a plurality of different features, attributes, or characteristics. A "system" as used herein refers to various configurations of: (a) one or more servers; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Thus, in various embodiments, the system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the system includes a plurality of EGMs that are each configured to communicate with a server through a data network.

In certain embodiments in which the system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the system includes a server and an EGM (or personal gaming device) each located in a different gaming establishment in a same geographic area, such as a same city or a same state. Systems in which the data network is a WAN are substantially identical to systems in which the data network is a LAN, though the quantity of EGMs (or personal gaming devices) in such systems may vary relative to one another.

In further embodiments in which the system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 6:
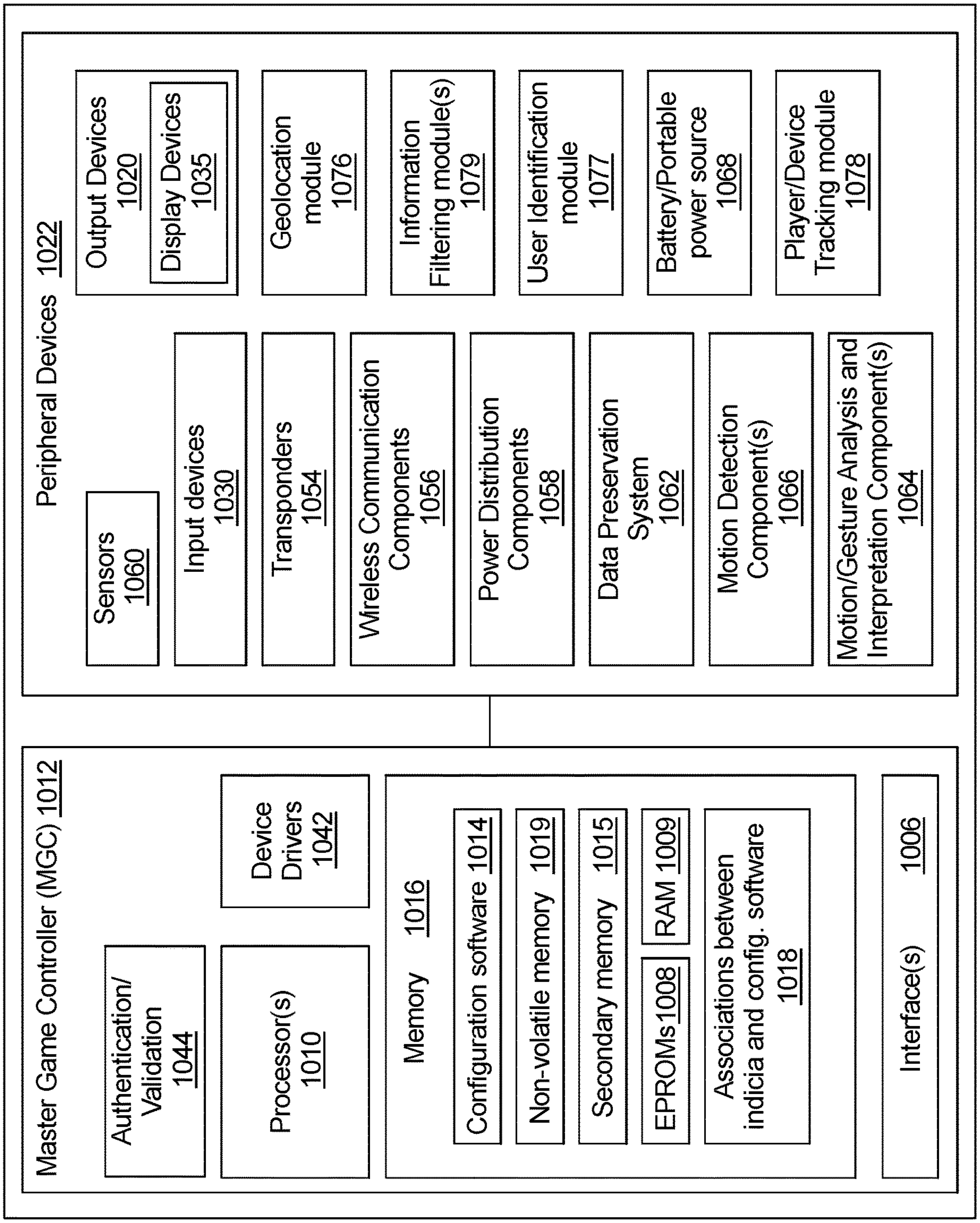
FIG. 6 is a schematic block diagram of one embodiment of an electronic configuration of an example system of the present disclosure.
Figure 7A:
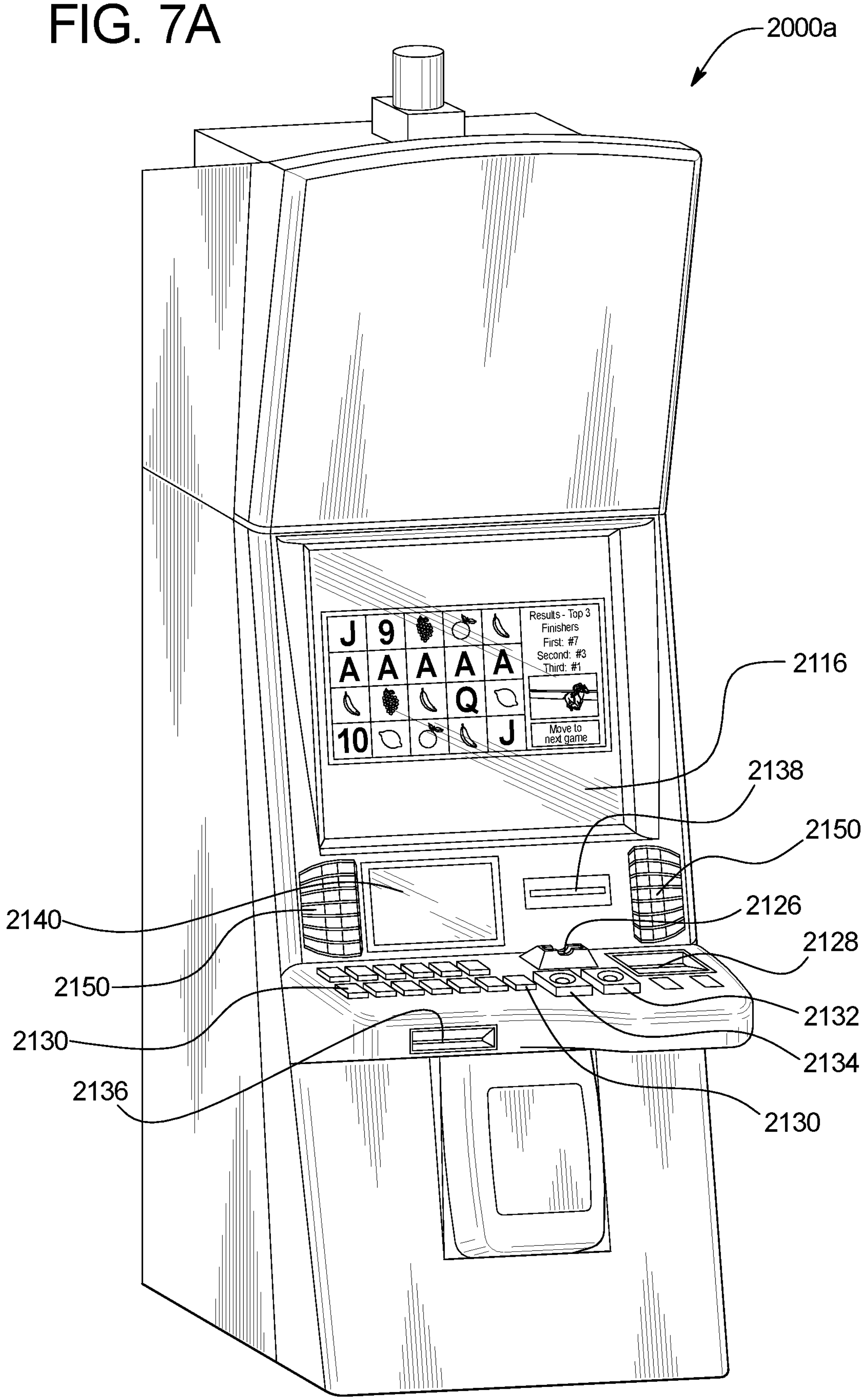
FIGS. 7A and 7B are perspective views of example alternative embodiments of the system disclosed herein.
Figure 7B:
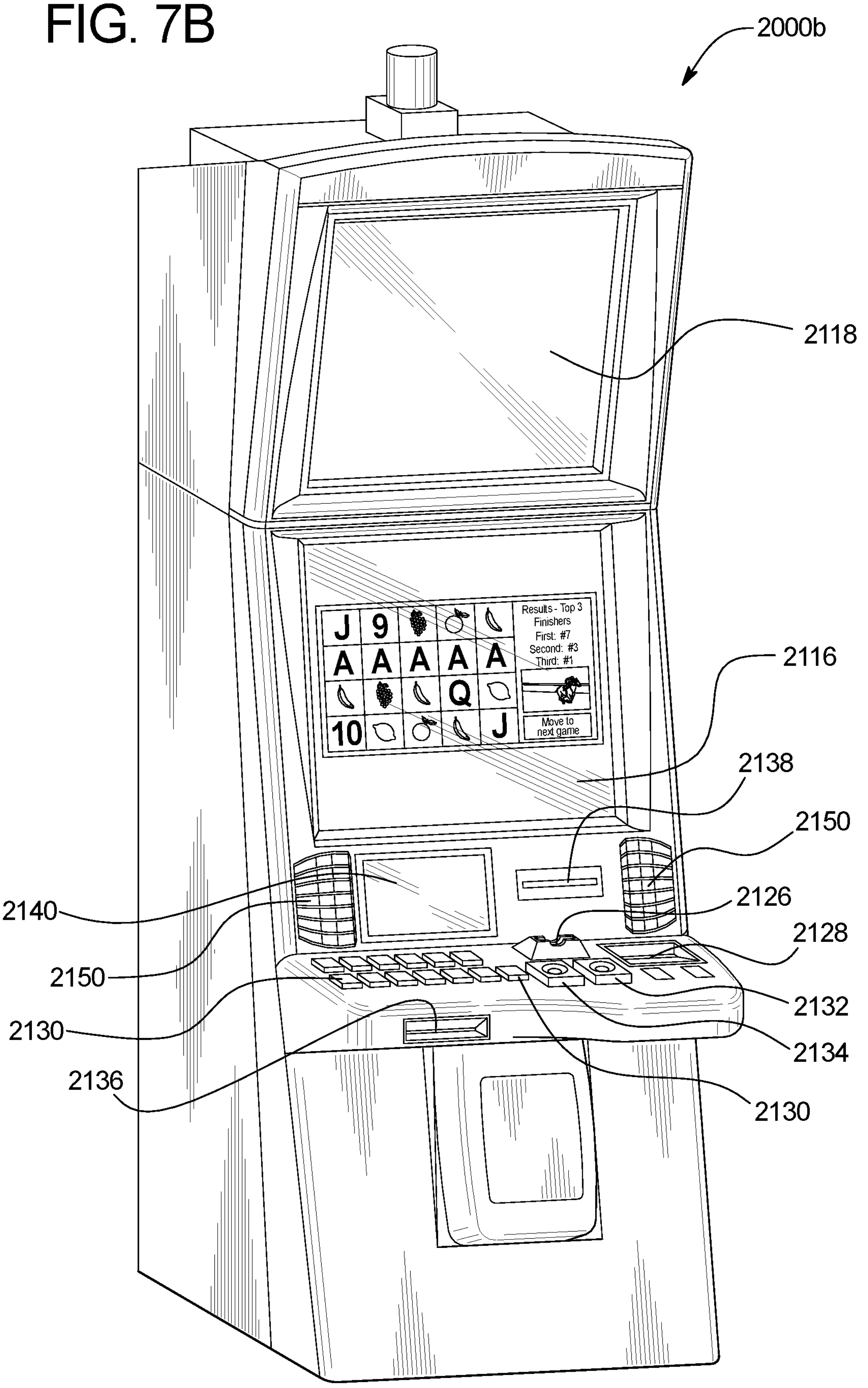
Figure 7C:
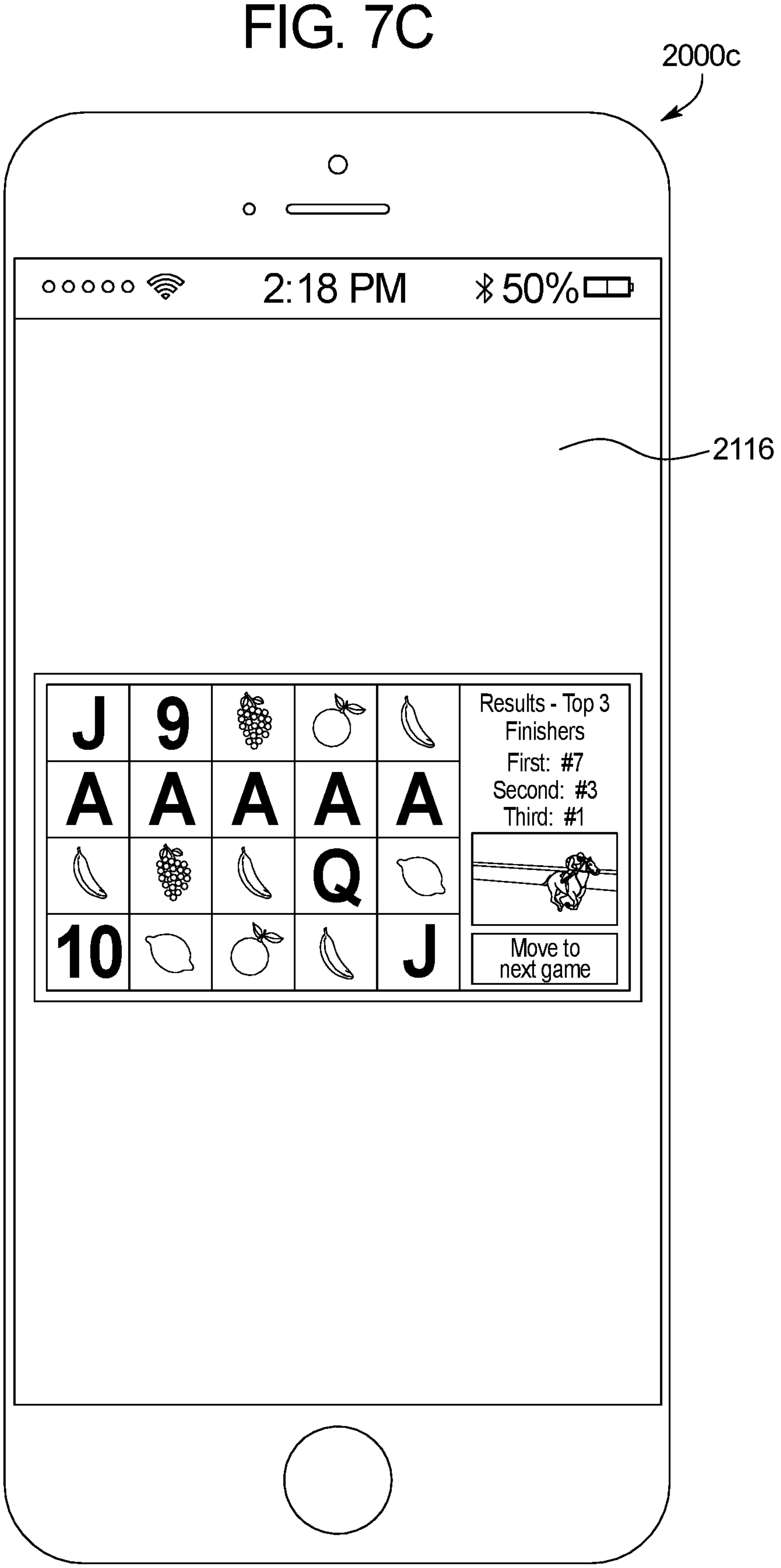
FIG. 7C is a front view of an example personal gaming device of the system of the present disclosure.

FIG. 6 is a block diagram of an example EGM 1000 and FIGS. 7A and 7B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 7C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 7A includes a central display device 2116, a player tracking display 2140, a credit display 2120, and a bet display 2122. The example EGM 2000*b* illustrated in FIG. 7B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 7A and 7B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 7A and 7B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 7A and 7B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 7A and 7B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 7A and 7B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 7A and 7B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 7A and 7B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 7A and 7B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 7A and 7B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all systems, and these example EGMs may not include one or more elements that are included in other systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any alternative gaming presentations displayed as primary or base games (referred to herein as "primary games") and/or any alternative gaming presentations displayed as any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any alternative gaming presentations displayed as any primary games and/or any alternative gaming presentations displayed as secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, as an alternative to utilizing a pool of win amounts to select one or more win amounts for a winning wager on a historical horse race, the system determines a win amount for a winning wager on a historical horse race based on the results of a bingo, keno, or lottery game. In certain such embodiments, the system utilizes one or more bingo, keno, or lottery games to determine the win amount for a winning wager on a historical horse race. The system is provided or associated with a bingo card. Each bingo card consists of a matrix or array of elements, wherein each element is designated with separate indicia. After a bingo card is provided, the system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, the win amount is determined based, at least in part, on the selected elements on the provided bingo cards.

In certain embodiments in which the system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the system includes one or more executable game programs executable by at least one processor of the system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the system. In certain such embodiments, the system includes one or more paylines associated with the reels. The example EGM 2000*b* shown in FIG. 7B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The system enables a wager to be placed on one or more of such paylines to activate such paylines. In other embodiments in which one or more paylines are formed between at least two adjacent symbol display areas, the system enables a wager to be placed on a plurality of symbol display areas, which activates those symbol display areas.

In various embodiments, the system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the system includes a progressive award. Typically, a progressive award includes an initial amount and an additional amount funded through a portion of each wager placed to initiate a play of a primary game. When one or more triggering events occurs, the system provides at least a portion of the progressive award. After the system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the system automatically provides or initiates the secondary game upon the occurrence of a triggering event or the satisfaction of a qualifying condition. In other embodiments, the system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the system determines when to provide one or more plays of one or more secondary games with no apparent reason provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the system includes one or more player tracking systems. Such player tracking systems enable operators of the system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the system to begin a gaming session, the card reader reads the player identification number off the player tracking card to identify the player. The system timely tracks any suitable information or data relating to the identified player's gaming session. The system also timely tracks when the player tracking card is removed to conclude play for that gaming session. In another embodiment, rather than requiring insertion of a player tracking card into the card reader, the system utilizes one or more portable devices, such as a mobile phone, a radio frequency identification tag, or any other suitable wireless device, to track when a gaming session begins and ends. In another embodiment, the system utilizes any suitable biometric technology or ticket technology to track when a gaming session begins and ends.

In such embodiments, during one or more gaming sessions, the system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a predetermined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the system includes a geo-fence system that enables tethered game play within a particular geographic area but not outside of that geographic area.

In certain embodiments, the system is configured to communicate with a social network server that hosts or partially hosts a social networking website via a data network (such as the Internet) to integrate a player's gaming experience with the player's social networking account. This enables the system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the system to receive certain information from the social network server, such as the player's likes or dislikes or the player's list of connections. In certain embodiments, the system enables the player to link the player's player account to the player's social networking account(s). This enables the system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the system enables the player to recommend a game to the player's connections by posting a recommendation to the player's wall (or other suitable area) of the social networking website.

Certain of the systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:
- a processor; and
- a memory device that stores a plurality of instructions that, when executed by the processor following a placement of a wager on an outcome of a historical horse race and responsive to a determination that the wager on the outcome of the historical horse race is a winning wager, cause the processor to:
  - randomly select a win amount from a pool of win amounts, and
  - communicate data that results in a display device causing a display of a winning game outcome associated with the randomly selected win amount.

2. The system of claim 1, wherein the display of the winning game outcome is associated with an alternative gaming presentation associated with the historical horse race.

3. The system of claim 2, wherein a first pool of win amounts associated with a first wager on the outcome of the historical horse race is associated with a first set of parameters of the alternative gaming presentation and a second, different pool of win amounts associated with a second, different wager on the outcome of the historical horse race is associated with a second, different set of parameters of the alternative gaming presentation.

4. The system of claim 1, wherein a first wager on the outcome of the historical horse race is associated with a first pool of win amounts and a second, different wager on the outcome of the historical horse race is associated with a second, different pool of win amounts.

5. The system of claim 1, wherein the memory device stores a plurality of further instructions that, when executed by the processor, cause the processor to prevent the randomly selected win amount from being randomly selected in association with another historical horse race.

6. The system of claim 1, wherein the placement of the wager on the outcome of the historical horse race is associated with a quantity of minimum wagers placed.

7. The system of claim 6, wherein each of the quantity of minimum wagers placed is associated with a wager across a plurality of historical horse races.

8. The system of claim 1, wherein the memory device stores a plurality of further instructions that, when executed by the processor, cause the processor to escrow any randomly selected win amount that is less than an amount of the wager to a carryover pool.

9. The system of claim 8, wherein the memory device stores a plurality of further instructions that, when executed by the processor responsive to the determination that the wager on the outcome of the historical horse race is the winning wager and a determination that a combination of the randomly selected win amount and a value of the carryover pool is at least equal to the amount of the wager, cause the processor to communicate data that results in the display device causing a display of the winning game outcome associated with the randomly selected win amount and the value of the carryover pool in the alternative gaming presentation associated with the historical horse race.

10. A system comprising:
- a processor; and
- a memory device that stores a plurality of instructions that, when executed by the processor, cause the processor to:
  - responsive to a determination that a first wager placed on a historical horse race associated with a first non-horse race game is a first winning wager:
    - randomly select a win amount from a first pool of win amounts, and
    - communicate data that results in a display device causing a display of a winning game outcome of the first non-horse race game, wherein based on a first paytable associated with the first non-horse race game, the winning outcome of the first non-horse race game is associated with the randomly selected win amount from the first pool of win amounts, and
  - responsive to a determination that a second wager placed on the historical horse race associated with a second non-horse race game is a second winning wager:
    - randomly select a win amount from a second, different pool of win amounts, and
    - communicate data that results in the display device causing a display of a winning game outcome of the second non-horse race game, wherein based on a second paytable associated with the second non-horse race game, the winning outcome of the second non-horse race game is associated with the randomly selected win amount from the second, different pool of win amounts.

11. The system of claim 10, wherein the memory device stores a plurality of further instructions that, when executed by the processor, cause the processor to prevent each win amount randomly selected from one of the pools of win amounts from being randomly selected from that pool of win amounts in association with another historical horse race.

12. A method of operating a system, the method comprising:
- following a placement of a wager on an outcome of a historical horse race and responsive to a determination that the wager on the outcome of the historical horse race is a winning wager:
  - randomly selecting, by a processor, a win amount from a pool of win amounts, and
  - displaying, by a display device, a winning game outcome associated with the randomly selected win amount.

13. The method of claim 12, wherein the display of the winning game outcome is associated with an alternative gaming presentation associated with the historical horse race.

14. The method of claim 13, wherein a first pool of win amounts associated with a first wager on the outcome of the historical horse race is associated with a first set of parameters of the alternative gaming presentation and a second, different pool of win amounts associated with a second, different wager on the outcome of the historical horse race is associated with a second, different set of parameters of the alternative gaming presentation.

15. The method of claim 12, wherein a first wager on the outcome of the historical horse race is associated with a first pool of win amounts and a second, different wager on the outcome of the historical horse race is associated with a second, different pool of win amounts.

16. The method of claim 12, further comprising preventing the randomly selected win amount from being randomly selected in association with another historical horse race.

17. The method of claim 12, wherein the placement of the wager on the outcome of the historical horse race is associated with a quantity of minimum wagers placed.

18. The method of claim 17, wherein each of the quantity of minimum wagers placed is associated with a wager across a plurality of historical horse races.

19. The method of claim 12, further comprising escrowing any randomly selected win amount that is less than an amount of the wager to a carryover pool.

20. The method of claim 19, further comprising, responsive to the determination that the wager on the outcome of the historical horse race is the winning wager and a determination that a combination of the randomly selected win amount and a value of the carryover pool is at least equal to the amount of the wager, displaying, by the display device, the winning game outcome associated with the randomly selected win amount and the value of the carryover pool in the alternative gaming presentation associated with the historical horse race.

* * * * *